A. E. HANSEN, DEC'D.
E. HIPP, ADMINISTRATRIX.
TRACK LEVEL AND GAGE.
APPLICATION FILED MAY 10, 1916.
1,224,165.
Patented May 1, 1917.
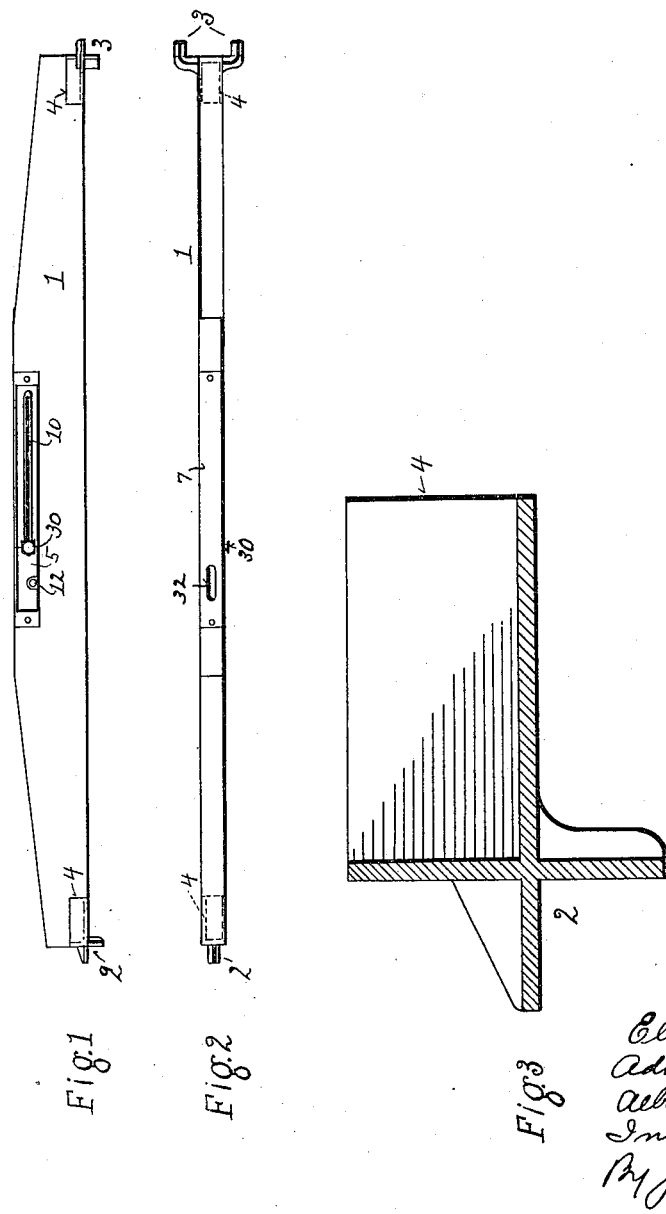

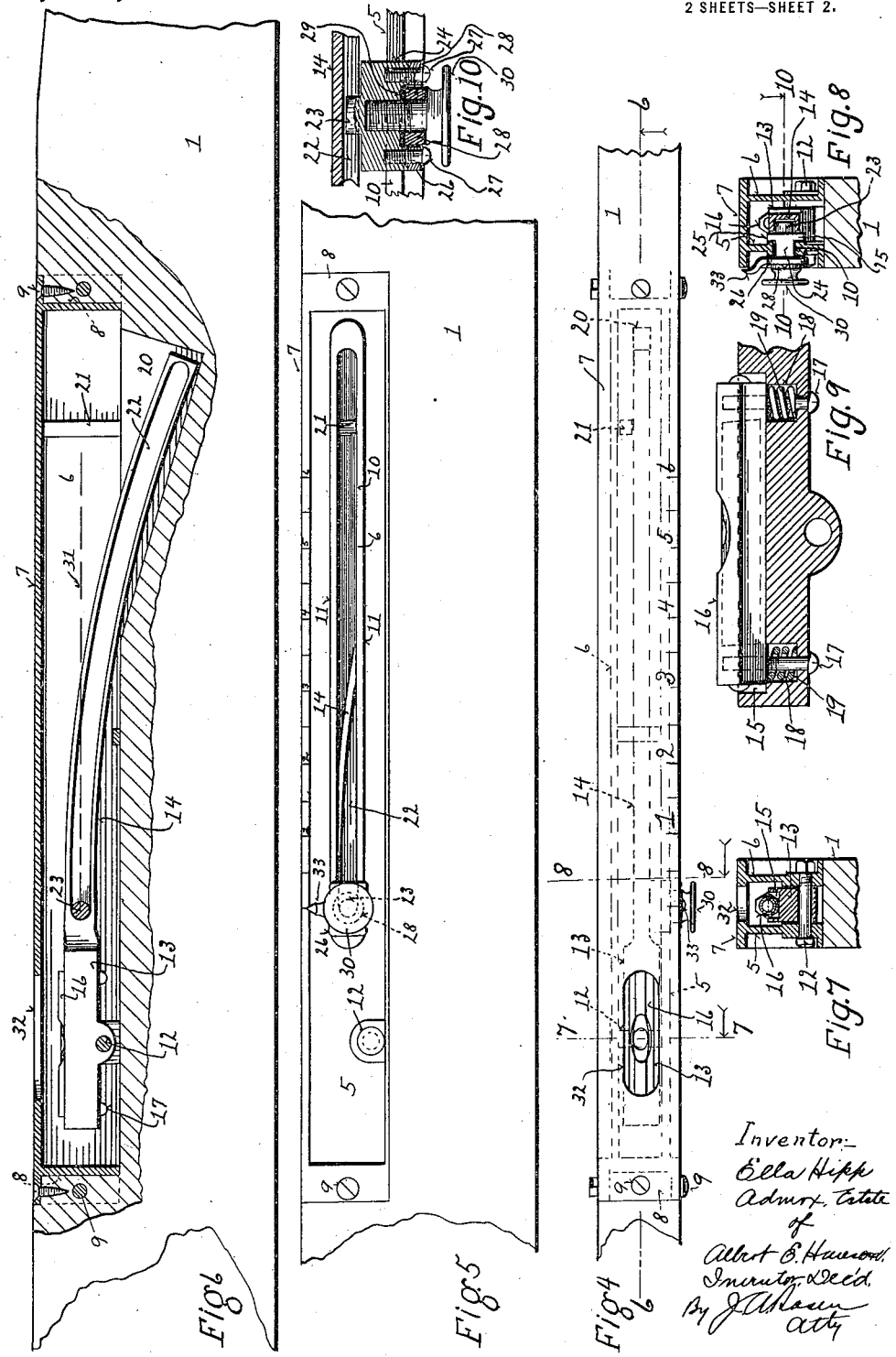

UNITED STATES PATENT OFFICE.

ALBERT E. HANSEN, DECEASED, LATE OF TOPEKA, KANSAS, BY ELLA HIPP, ADMINISTRATRIX, OF TOPEKA, KANSAS.

TRACK LEVEL AND GAGE.

1,224,165.　　　　Specification of Letters Patent.　　Patented May 1, 1917.

Application filed May 10, 1916. Serial No. 96,591.

*To all whom it may concern:*

Be it known that ALBERT E. HANSEN, deceased, late a citizen of the United States of America, and resident of Topeka, in the county of Shawnee and State of Kansas, did invent certain new and useful Improvements in Track Levels and Gages, of which the following is a specification.

This invention is a combination instrument adapted for railway track work for properly spacing the rails apart from each other and for determining and fixing their relative elevations. It is the object of the invention to construct a combination instrument of this kind including an adjustable leveling device, adapted for simultaneously gaging the distance between the rails and their relative elevations. Inasmuch as an instrument adapted for this class of work is subject to particularly severe usage, further objects are simplicity and strength of construction, durability, and protection for the leveling element. A further object is to secure extreme accuracy and delicacy of the leveling adjustment with extreme simplicity of the adjusting means, with particular reference to the absence of such delicate parts as might under stress of rough handling be easily gotten out of order or out of accurate adjustment.

The invention comprises certain features of the construction of the gage for measuring the distance between the rails; also it comprises the distance gage coupled with an adjustable leveling gage; also it comprises certain features of the adjustable leveling gage in combination with the distance gage; also it comprises certain combinations relating to the adjustable leveling gage; also it comprises the parts, improvements, and combinations hereinafter set forth and claimed.

In the drawings accompanying and forming part of this specification and in the description of the drawings, the invention is shown in its preferred form and what is deemed to be the best mode of applying the principles thereof; and it is to be understood that, within the scope of the appended claims, changes in form, proportions, and materials, the transposition of parts, and the substitution of equivalent members, are contemplated, without departing from the spirit of the invention.

Figure 1 is a side elevation of a complete device made in accordance with the principles of the invention. Fig. 2 is a plan. Fig. 3 is a sectional elevation, on an enlarged scale, of one of the rail guides forming a housing for protecting the end of the beam. Fig. 4 is a plan of the leveling device with adjacent portions of the beam. Fig. 5 is a side elevation of the same. Fig. 6 is a vertical central sectional elevation of the same, approximately on a plane indicated by the line 6—6 in Fig. 4. Fig. 7 is a vertical transverse sectional elevation of the same, approximately on the plane indicated by the line 7—7 in Fig. 4. Fig. 8 is a similar elevation approximately on a plane indicated by the line 8—8 in Fig. 4. Fig. 9 is a central vertical sectional elevation of the leveling lever, approximately on the plane indicated by the line 6—6 in Fig. 4, on an enlarged scale. Fig. 10 is a sectional plan, on a similar scale, on a plane indicated approximately by the line 10—10 in Fig. 8.

Similar reference characters indicate like or corresponding parts throughout the several views.

Secured to opposite ends of the gage beam 1, which is preferably of wood, are the two rail guides 2 and 3, respectively, each formed integrally with a suitable boxing 4 forming a facing for the adjacent corners of the beams. Each guide has a downwardly extending finger for engaging against the inside of the rail, to measure the distance between the rails, and also a horizontally extending finger, to support the gage on top of the rails, the latter forming also an element of the leveling device. One of the guides preferably comprises two of each such fingers to insure setting the gage exactly at right angles across the track, as in the ordinary track gage. The boxings also serve to strengthen the guides themselves as well as to afford a means for strongly securing them to the beam ends by means of bolts or screws.

A casing comprising in the main the side walls 5 and 6 and the top 7 is formed with mortised ends shown at 8, 8 and is secured in the top edge of the beam which is cut away to receive the same, secure and permanent attachment being effected by means of bolts and screws 9, 9. The three surfaces are substantially flush with the corresponding surfaces of the beam, except that the side walls are preferably recessed as shown. A slot 10 is formed in one of the side walls and extends lengthwise of the gage exactly parallel with the line connecting the gage-supporting fingers which rest on the two rails; and bosses or ribs 11 are formed on both sides of the wall on each side of the slot for a purpose hereinafter explained. 12 is a pivot bolt spanning the chamber between the side walls, and thereon is pivoted the lever 13, 14, the part 13 immediately above the pivot being formed with a depression 15 in its upper surface for holding a spirit level 16. The spirit level is securely held in place by means of the screws 17, 17 inserted from underneath and by the compression springs 19, 19 accommodated in pockets 18, 18. The springs aid to prevent the screws from getting loose; they serve in connection with the screws for obtaining perfect adjustment of the disposition of the spirit level in the lever; and they also form to some degree a cushioned seat for the spirit level.

The longer portion 14 of the lever extends in the same general direction as the slot 10 but with a deflection therefrom, and preferably the deflection is a curve, which brings the end of the lever below the bottom of the casing side walls, and the stock of the wood beam is recessed, as shown at 20, to permit proper action of the lever. 21 is a guide secured to the casing to guide the lever in its proper plane. The side of the part 14 of the lever adjacent to the slot 10 is formed with a channel 22 in which snugly engages the stub pin 23 which projects inwardly from the slidable adjusting member mounted in the slot. This member is formed with flanges 25, 25 engaging against the inner faces of the inner ribs 11, 11, and with a neck 24 which extends through said slot. The neck is preferably elongated lengthwise of the slot and fits snugly and slidably between the sides of the slot. To the outer face or end of the neck is secured a plate 26, by means of screws 27, 27, and the plate is formed with a pointer 33 terminating adjacent to the upper edge of the casing. The flanges 25, 25 and the plate 26 bear against the opposite sides of side wall or ribs bordering the slot, but, as in the case of the fit of the neck within the sides of the slot, they admit of free movement of the adjusting member lengthwise of the slot; and it is preferred that the bearing parts be machined or otherwise made smooth, this being especially desired of the sides of the slot, and not so necessary in the case of the bearings against the inner and outer faces of the side wall. As a means for clamping the adjusting member in any position to which it may be moved along the slot, the washer 28 and the thumb-screw 30 are provided. The thumb-screw has screw-threaded engagement with the body of the adjusting member through the slot, and the washer is interposed between the head of the thumb-screw and the outer face of the side wall adjacent to the slot. The plate 26 is formed with a hole and the neck is formed with a countersink 29 in order to permit the washer to be pressed tightly against the side wall under pressure of the thumb-screw, so that the clamping member is held frictionally against movement, between the flanges 25, 25 and the washer, under pressure of the thumb-screw. The line of travel of the adjusting element is indicated in Fig. 6 by the broken line 31. The casing immediately above the spirit level is formed with an opening 32, through which the level is observed.

With the adjusting device in the position shown in the drawings, at the extreme left, the instrument is adjusted for testing rails on an exact level; that is to say, the spirit level is exactly parallel with the line on which the instrument is supported on the rails. If the adjusting element be moved to the right, the engagement of the stub pin 23 in the channel 22 will have the effect of raising the deflected end of the lever and thereby to tilt the spirit level; and if the adjusting element be set in such shifted position, then in order to bring the spirit level to an exact level it will be necessary to raise the left-hand end of the instrument; and the farther the adjusting element is moved to the right, the higher the left-hand end of the instrument must be raised to bring the spirit level to an exact level. By shifting the adjusting element again to the left, the left-hand end of the instrument may be lower in order to secure an exact level of the spirit level.

It is preferred to predetermine the differences in elevation of the two supporting ends of the instrument in order to secure an exact level of the spirit level in the various positions of the adjusting element. This, obviously, may be calculated accurately from the line of support, the position of the lever and the angle of deflection of the lever from the slot, etc. Since, however, in track work, a given instrument is adapted as a track gage for only a certain gage of track, and since the differences in the elevations of the two rails is usually indicated by inches and fractional parts of inches, which method is readily understood by the workmen actively engaged in the actual work, it is preferred to adapt the adjustment to that method; and therefore it is preferred that immediately adjacent to the pointer 33 the top or the side wall or both shall be scored to indicate the inches and fractional parts of inches of difference in the elevation of the two rails to which the instrument is applied. In practical use, therefore, if the workman desires to raise the outer rail one inch above the inner rail, he shifts the adjusting device so that the pointer rests at the score marked 1″, and rests the instrument on the rails, the left-hand end of the instrument (as viewed in the drawings) resting on the outer or higher rail. When the spirit level is brought to an exact level, he knows that the outer rail is exactly one inch higher than the inner rail. Similarly, by shifting the adjusting element, the instrument may be set to gage any other difference in elevation that may be desired, within a wide range.

It is an important feature of this invention that it is easily understood and manipulated by those engaged in track work. It is also important that while extreme delicacy of adjustment is possible, the adjusting element requires a comparatively long travel, thus making its use accurate. It is also important that the means for clamping the adjusting element in adjusted position is such that its operation does not in the slightest degree tend to disturb the exact adjustment of the lever. It is also important that though great delicacy of adjustment is possible, the parts themselves are not delicate, but are strong, durable, thoroughly protected, and not likely to get out of order. The adjusting device is so arranged that there is scarcely any tendency for it to become inadvertently shifted, even though it be not firmly clamped, while the gage rests on the rails, even though it receive such jolts as are inevitable while the workmen are manipulating the adjacent rails, ties, etc.

What is claimed is:

1. The combination with a track gage formed for being supported upon the rails, of a casing secured thereon and formed with a chamber, an opening through its top, and a slot through its side wall extending parallel with the line of support, a lever within said casing pivoted below said opening and formed with a portion extending in the same general direction as the slot but having a curved deflection therefrom, a leveling device secured to the lever immediately below said opening, an adjusting element slidably mounted in said slot and engaging said curved portion of said lever, and a clamping element for clamping the adjusting element in adjusted position.

2. The combination with a track gage formed for support upon the rails; of a casing thereon formed with a slot in its wall extending parallel with the line of support and formed also with an opening, a level-supporting element pivotally mounted within said casing and formed with an elongated portion having a deflection from said slot, a level supported on said level-supporting element, and an adjusting device slidably mounted in said slot and engaging said elongated portion, the movement of the adjusting element lengthwise of the slot having the effect of tilting said level-supporting element and the level secured thereon; said casing being formed with an opening through which the level is observable.

3. The combination with a track gage formed for support upon the rails; of a level and a level-supporting element pivotally mounted on said gage, tracks formed on the gage and on the level-supporting element and extending in the same general direction but with a deflection from each other, and an adjusting device engaging said tracks and slidable therealong for tilting said level and level-supporting element.

4. The combination with a track gage formed for support upon the rails; of a level-controlling element pivotally mounted thereon, a level associated with said level-controlling element, tracks formed on the gage and on the level-controlling element and extending in the same general direction and deflecting from each other, an adjusting device slidably engaging said tracks and whose movement lengthwise of the tracks tilts the level-controlling element and the level, and means for clamping the adjusting device in adjusted position.

5. The combination with a track gage formed for support upon the rails; of a level-controlling element pivotally mounted thereon so as to oscillate in a vertical plane, a level associated with said level-controlling element, tracks or ways formed on the gage and on the level-controlling element and extending generally in the direction of the line of support but having a deflection from each other, an adjusting device engaging said tracks or ways and movable lengthwise thereof and such movement tilting said level-controlling element and level, and means for clamping said adjusting device in adjusted position.

6. The combination with a track gage formed for support upon the rails; of a casing secured to the upper edge of said gage and formed with a slot through its side wall extending parallel with the line of support, a level-controlling element pivotally mounted within the casing so as to be capable of oscillating vertically on its pivot, a level associated with said level-controlling element, said level-controlling element being formed with a track or way extending adjacent to said slot and having a vertical deflection from said slot, an adjusting device movably engaging said slot and said track or way and adapted by its movement lengthwise of the slot and its engagement with said track or way to tilt said level-controlling element and said level, and means for fastening said adjusting device in adjusted position.

7. The combination with a track gage formed for support upon the rails; of a casing secured to said gage and formed with an opening through its top and with a slot through its side wall extending substantially parallel with the line of support, a level-supporting element pivotally mounted within said casing so as to be capable of oscillating vertically on its pivot, a level mounted on said level-supporting element and observable through said opening, said level-supporting element being formed with a way extending adjacent to said slot and having a curved vertical deflection therefrom, an adjusting device movably mounted in said slot and engaging said way and adapted by its movement lengthwise of the slot and its engagement with the way to oscillate said level-supporting element and said level, and a means for clamping said adjusting device in adjusted position; said adjusting device being formed with a pointer and said casing being formed with graduation marks associated with said pointer.

8. The combination with a casing formed for association with a suitable supporting element and formed also with an opening through its top and with a slot through its side wall extending substantially parallel with the line of support, a level-supporting element pivotally mounted within said casing so as to be capable of oscillating vertically on its pivot, a level mounted on said level-supporting element and observable through said opening, said level-supporting element being formed with a way extending adjacent to said slot and having a curved vertical deflection therefrom, an adjusting device slidably mounted in said slot and engaging said way and adapted by its movement lengthwise of the slot and its engagement with the way to oscillate said level-supporting element and to tilt the level, and a means for clamping the adjusting device in adjusted position; said adjusting device being formed with a pointer and said casing being formed with graduation marks associated with said pointer.

9. The combination of a supporting element, a level-controlling element pivotally mounted thereon so as to be capable of oscillating vertically, a level associated with said level-controlling element, ways formed on the supporting element and on the level-controlling element and extending in the same general direction but having a deflection from each other, and an adjusting element engaging said ways and movable lengthwise thereof, such movement oscillating said level-controlling element and tilting said level, and means for securing said adjusting element in adjusted position.

ELLA HIPP,
*Administratrix, with the will annexed, of the estate of Albert E. Hansen, deceased.*

Copies of this patent may be obtained for five cents each, by addressing the "Commissioner of Patents, Washington, D. C."